United States Patent [19]

Katahira

[11] Patent Number: 4,826,330
[45] Date of Patent: May 2, 1989

[54] LINEAR GUIDE APPARATUS WITH END CAPS HAVING FITTING PROTRUSIONS

[75] Inventor: Masayuki Katahira, Maebashi, Japan

[73] Assignee: Nippon Seiko Kabushiki Kaisha, Tokyo, Japan

[21] Appl. No.: 187,492

[22] Filed: Apr. 28, 1988

[30] Foreign Application Priority Data

Apr. 30, 1987 [JP] Japan .............................. 62-65572[U]

[51] Int. Cl.⁴ ............................................. F16C 29/06
[52] U.S. Cl. ...................................................... 384/45
[58] Field of Search ............................. 384/45, 43, 44; 464/168

[56] References Cited

U.S. PATENT DOCUMENTS

| | | |
|---|---|---|
| 4,472,003 | 9/1984 | Osawa . |
| 4,511,188 | 4/1985 | Walter et al. .................. 384/43 |
| 4,557,530 | 12/1985 | Haase ............................ 384/45 |
| 4,557,532 | 12/1985 | Teramachi ..................... 384/45 |
| 4,647,226 | 3/1987 | Mottate ......................... 384/45 |

FOREIGN PATENT DOCUMENTS 6010 1/1983 Japan .
116119 6/1986 Japan .

*Primary Examiner*—Lenard A. Footland
*Attorney, Agent, or Firm*—Basile and Hanlon

[57] ABSTRACT

Each of end caps attached to opposite ends of a slider main body has a curved ball groove for connecting a ball rolling path formed by mutually opposing ball rolling grooves of a guide rail and a slider main body to a ball circulating path of the slider main body. In the end cap, the end portion of the curved ball groove to be joined to the ball circulating path of the slider main body is extended tangentially toward the slider main body to form a fitting protrusion having an extended groove. The slider main body is formed with a fitting recess in the end face thereof at the end portion of the ball circulating path to receive the fitting protrusion therein. When the fitting protrusion is fitted into the fitting recess, the curved ball groove is connected to the ball circulating path through the extended groove of the fitting protrusion without causing a stepped portion to be formed at the joining portion between the end cap and the slider main body.

1 Claim, 3 Drawing Sheets

LINEAR GUIDE APPARATUS WITH END CAPS HAVING FITTING PROTRUSIONS

BACKGROUND OF THE INVENTION

1. Field of the Invention

The present invention relates to a linear guide apparatus provided with infinite circulating paths of rolling balls interposed between a guide rail and a slider movable on the guide rail, and in particular, to the linear guide apparatus improved to obtain an operational performance with high accuracy.

2. Description of the Relevant Art

A linear guide apparatus of this type is disclosed, for example, in U.S. Pat. No. 4,472,003. In this linear guide apparatus, as shown in FIGS. 1 and 2 of this application, a slider 4 is formed with an axial recess 1. A pair of axial ball rolling grooves 2 are formed in the inner surfaces of the axial recess 1, and axial through holes 3 are bored at lateral positions with respect to the ball rolling grooves 2. An elongate guide rail 9 has axial ball rolling grooves 8, respectively, opposing the ball rolling grooves 2 of the slider 4. End caps 6 are respectively secured to opposite ends of the slider. Each of the end caps 6 has a semicircular ball path (curved ball groove) 5 for connecting the mutually opposing ball rolling grooves 2 and 8 to the through hole 3 of the slider 4. A multiplicity of balls 7 are rollably inserted between the opposing ball rolling grooves 2 and 8, through holes 3, and semicircular ball paths 5.

The guide rail 9 is secured to a mounting base (not shown) by a bolt inserted through a bolt hole 10. The end caps 6 are attached to the slider 4 by screws 12 which are threaded into threaded holes 11 formed in end faces of the slider 4. The numeral 13 designates a threaded hole for fixing an article to the slider 4.

When the slider 4 moves in the axial direction on the guide rail 9, relative to the latter, the ball 7 rolls and circulates through the through hole 3, semicircular ball path 5, and between the ball rolling grooves 2 and 8 thereby enabling the slider 4 to travel smoothly.

However, in manufacture, it is difficult to accurately position the center of the circular arc defining the semicircular ball path 5 at the joining end face of the end cap 6 to the slider 4. Accordingly, the opposite end portions of the semicircular ball path 5 are not necessarily coincident with the ends of the semicircle of end cap 6. As a result, stepped portions will be formed in the ball circulating path at the joining planes between the slider 4 and the end cap 6. The balls 7, within the semicircular ball path 5, are moved by subsequent balls and, since the semicircular ball path 5 is curved outwardly, the balls 7 move while being pressed against the outside inner wall of the ball path 5. Furthermore, when the slider 4 travels at high speeds, the balls 7 will be further pressed against the outside inner wall surface by a centrifugal force exerted to the balls 7. These pressing forces, imparted to the balls 7, are gradually decreased as the balls 7 approach the straight through hole 3, and the forces become zero when the balls 7 reach a position in the through hole 3 which is spaced from the entrance thereof by a distance corresponding to the diameter of the balls 7. For this reason, at the joining portion A between the semicircular ball path 5 and the ball through hole 3 of the slider 4, the balls 7 passing through this portion A are pressed against the stepped portion in the ball circulating path. Consequently, if such a stepped portion is formed at this joining portion, even a slight step, ball circulation will be disrupted and vibrations will be caused.

In particular, in those linear guide apparatus used for hard disk driving devices and the like, which are required to be operated with extremely high accuracy, the diameter of the balls 7 are as small as 2 mm. Thus, any influence caused by even a minute error in dimension will pose a serious problem.

SUMMARY OF THE INVENTION

It is an object of the present invention to provide a linear guide apparatus in which the joining plane between a semicircular ball path disposed in an end cap and a through hole formed in a slider, at which location a stepped portion tends to be formed during manufacture is provided free from said step at a position in the ball circulating path where the balls are pressed against the inner wall of the ball circulating path.

In order to achieve the above object, a linear guide apparatus of the present invention comprises a guide rail extending in an axial direction and having a pair of ball rolling grooves formed in opposite side surfaces. A slider main body is mounted on the guide rail in a straddling relationship therewith and has ball rolling grooves formed in inner surfaces of the side walls of the slider main body opposing the ball rolling grooves of the guide rail. The slider main body further has ball circulating paths formed in the side walls in parallel to the ball rolling grooves in the inner surfaces. A pair of end caps is respectively joined to opposite ends of the slider main body. Each of the end caps has a curved ball groove for connecting the ball circulating path of the slider main body and the ball rolling groove of the guide rail. A multiplicity of balls is inserted between the opposing ball rolling grooves, and in the ball circulating paths and the curved grooves. Each end cap is formed with a fitting protrusion at the joining portion between the curved groove of the end cap and the ball circulating path of the slider main body. The fitting protrusion has an extended groove formed therein, extending tangentially from an end of the outside semicircle defining the curved ball groove so that the curved ball groove is joined smoothly to the ball circulating path. Additionally, the slider main body is formed with a fitting recess to receive the fitting protrusion of the end cap.

In the curved ball groove of the end cap, which serves as a direction changing portion of the ball circulating path, since the end of the outside semicircle of the curved ball groove is extended tangentially, the balls are guided smoothly between the curved ball groove and the ball circulating path. Furthermore, since the accurate positioning of the end cap relative to the slider main body is attained by the fitting protrusion of the end cap and the fitting recess of the slider main body, it is possible to prevent the stepped portion from being formed in the circulating path due to an assembly error.

Moreover, even when a minute stepped portion is formed in the joining portion, since the joining portion is in a straight movement region of the ball path, in which the balls are not pressed against the inner wall of the circulating path, the balls are not shaken.

DESCRIPTION OF THE PREFERRED EMBODIMENTS

Figure 1:
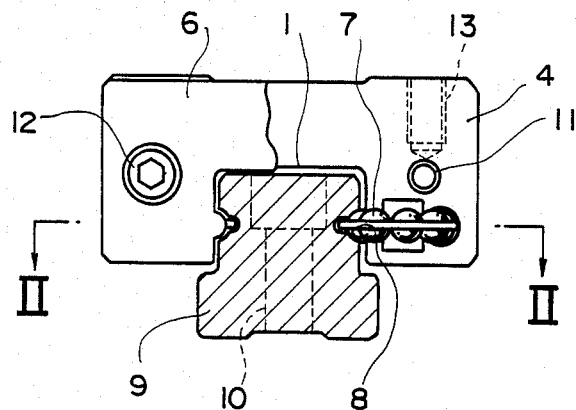
FIG. 1 is a front view including a partial cross section of a prior art linear guide apparatus.
Figure 2:
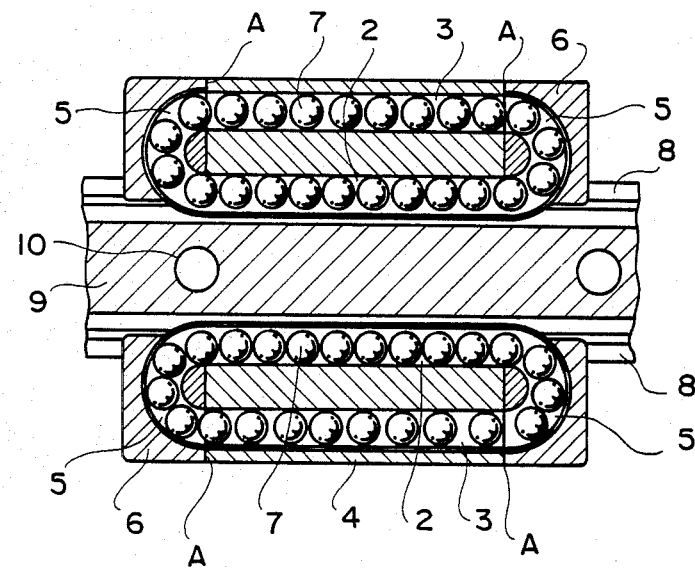
FIG. 2 is a longitudinal sectional view taken along the line II—II in FIG. 1.
Figure 3:
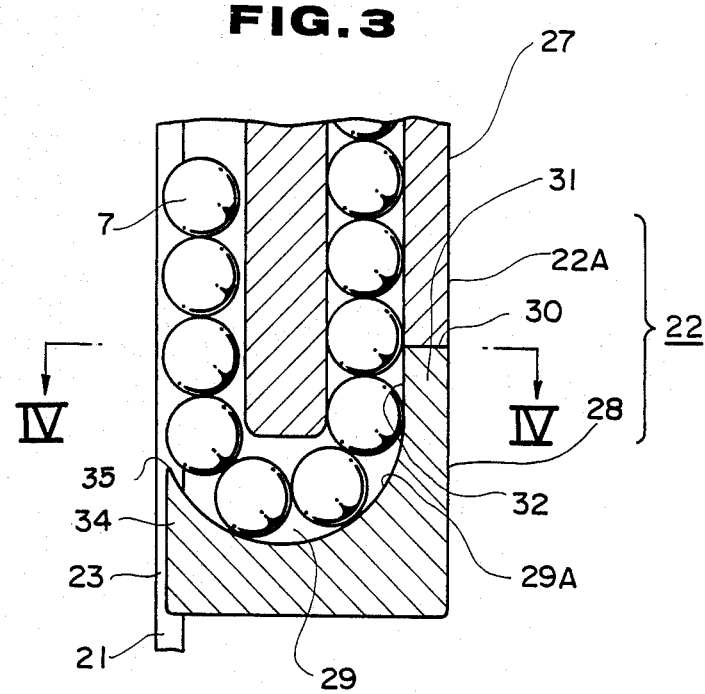
FIG. 3 is a partial sectional view of a slider of a linear guide apparatus embodying the present invention.
Figure 4:
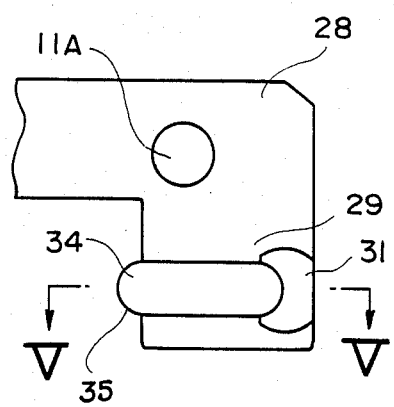
FIG. 4 is a partial rear view of an end cap as viewed from the line IV—IV in FIG. 3.
Figure 5:
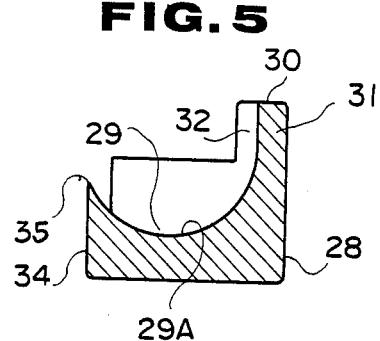
FIG. 5 is a sectional view taken along the line V—V in FIG. 4.
Figure 6:
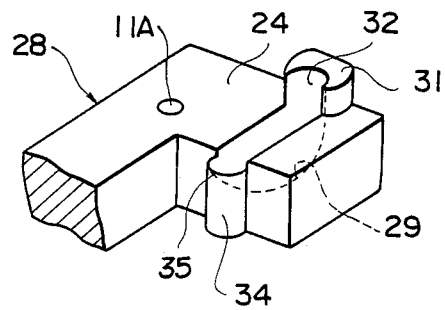
FIG. 6 is a perspective view of the end cap of FIG. 4.
Figure 7:
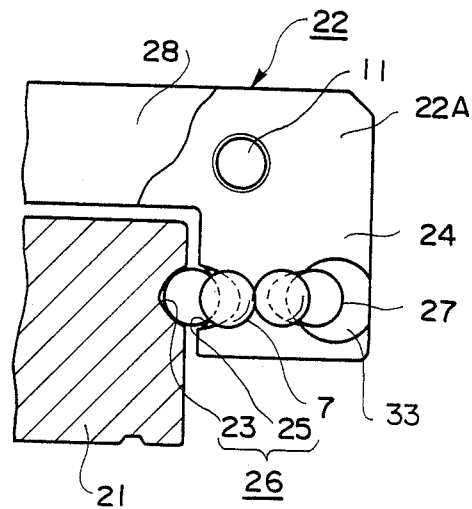
FIG. 7 is a partial front view, partially cut away, of the linear guide apparatus of the present invention.

An embodiment of the present invention will be described with reference to FIGS. 3 to 7 in which identical reference numerals designate identical or equivalent parts.

A slider 22, as a sliding table having an inverted U-shaped cross section, is movably mounted in a straddling configuration upon a guide rail 21. The guide rail 21 has a ball rolling groove 23, having a substantially V-shaped cross section, formed in each of the side surfaces and extending in the axial direction. The main body 22A of the slider 22 has a ball rolling groove 25 formed in the inner surface of each of side walls 24 so that the ball rolling groove 25 opposes the ball rolling groove 23 of the guide rail 21. The two opposing ball rolling grooves 23 and 25 constitute a ball rolling path 26. A ball circulating path 27 having a circular cross section is further formed within each of the side walls of slider main body 22A, extending in the axial direction in parallel to the ball rolling groove 25. End caps 28, as end plates, are respectively joined to opposite ends of the slider main body 22A, and each of the end caps 28 has a curved ball groove 29, formed therein. The curved ball groove 29 connects the ball circulating path 27 in the slider main body 22A to the ball rolling path 26, constituted by the mutually opposing ball rolling grooves 23 and 25, of the guide rail 21 and slider main body 22A.

The end cap 28 has a fitting protrusion 31 at the joining portion of the ball circulating path 27 of the slider main body 22A and the curved groove 29 of the end cap 28. The fitting protrusion 31 extends along the curved groove 29 toward the slider main body 22A in the axial direction. An extended groove 32 is formed in the fitting protrusion 31, and extends tangentially from the end of an outside semicircle 29A defining the curved ball groove 29 by a length corresponding to a diameter of the balls 7, so that the curved ball groove 29 is joined smoothly to the ball circulating path 27 of the slider main body 22A.

A fitting recess 33 is formed in the end face of the slider main body 22A so that the fitting protrusion 31 is closely fitted into the fitting recess 33.

Moreover, the end cap 28 has a protruding portion 34 at the arcuate end portion of the curved ball groove 29 which confronts the ball rolling path 26. The protruding portion 34 has a semicircular cross section and protrudes across the thickness of the end cap 28 inwardly toward the side of the guide rail 21. An edge 35 formed in the protruding portion 34 by the curved ball groove 29 has an acute angle so that the edge 35 can be brought toward the bottom of the ball rolling groove 23 of the guide rail 21 as close as possible allowing the balls 7 to roll smoothly at the joining portion between the curved ball groove 29 and the ball rolling groove 23.

The end cap 28 is joined to the slider main body 22A by a fixing screw as in the prior art linear guide apparatus. For this purpose, a threaded hole 11 is provided in the end face of the slider main body 22A, and a screw through hole 11A is formed in the end cap 28.

The operation of the embodiment will be described. When the slider 22 is moved on the guide rail 21 in the axial direction, the balls 7, inserted in the ball rolling path 26, roll with the movement of the slider 22 and move in a direction opposite to the movement direction of the slider 22. At the end of the ball rolling path 26, the balls 7 change their direction of movement by being introduced, by the curved edge portion 35 of the semicircular protrusion 34 of the end cap 28, into the curved ball groove 29. The balls 7 subsequently pass through the ball circulating path 27 of the slider main body 22A, and make a U-turn again through curved ball groove 29 of end cap 28, at the other end of the slider main body 22A, returning to the ball rolling path 26. In this manner, the balls 7 continuously circulate. Since the joining portion between the ball circulating path 27 and the curved ball groove 29 is made straight and smooth, and since the joining portion is not formed in the region in which the balls 7 are pressed against the wall surface, the balls 7 roll with stability and the circulation is performed smoothly. Accordingly, the operational performance of the linear guide apparatus which has been the problem in the prior art can be improved to a great extent.

Furthermore, the shapes of the fitting protrusion 31 and the fitting recess 33 are not limited to those used in the present embodiment. What is required is that the extended groove 32 is formed to join the ball circulating path 27 smoothly, and that the positioning of the slider main body 22A and the end cap 28 for joining to each other is achieved accurately.

As described in the foregoing, in the present invention, the joining of the end cap 28 and the slider main body 22A is effected by the fitting protrusion 31 formed on end cap 28, which has the extended groove 32 extending tangentially from the end of curved groove 29, and by the fitting recess 33 formed in the slider main body so that the fitting protrusion 31 is fitted into the fitting recess 33 to achieve accurate positioning. Furthermore, the joining portion between the ball circulating path 27 and the curved ball groove 29 is formed away from the region in which the balls are pressed against an wall surface. Accordingly, the advantage is provided in that the shaking of the balls 7 due to the stepped portion is not caused, and the operation of the slider is very stable and smooth.

While certain embodiments of the invention have been described in detail above in relation to linear guide apparatus with end caps having fitting protrusions, it will be apparent to those skilled in the art that the disclosed embodiment may be modified. Therefore, the foregoing description is to be considered exemplary rather than limiting, and the true scope of the invention is that defined in the following claims.

What is claimed is:

1. A linear guide apparatus comprising:
   a guide rail having a pair of ball rolling grooves respectively formed in opposite side surfaces and extending in an axial direction;
   a slider main body mounted on said guide rail, straddling thereon, and having ball rolling grooves formed in inner surfaces of said walls of said slider main body respectively opposing to said ball rolling grooves of said guide rail, said slider main body further having ball circulating paths respectively formed in said side walls in parallel to said ball rolling grooves in said inner surfaces;

a pair of end caps respectively joined to opposite ends of said slider main body, each of said end caps having a curved ball groove for connecting both of said ball rolling grooves of said guide rail and said slider main body to said ball circulating path of said slider main body through said curved ball groove; and a multiplicity of balls inserted rollably between said ball rolling grooves of said guide rail and said slider main body opposing to each other and in said ball circulating paths and said curved ball grooves;

said each end cap having, at a joining portion to said ball circulating path of said slider main body, a fitting protrusion formed with an extended groove extending tangentially from an end of an outside semicircle of said curved ball groove so as to join said curved ball groove to said ball circulating path;

said slider main body having a fitting recess formed in an end face to receive said fitting protrusion.

* * * * *